T. W. JERREMS.
GRASS TWINE MACHINE.
APPLICATION FILED JULY 7, 1910.

1,023,081.

Patented Apr. 9, 1912.
4 SHEETS—SHEET 1.

Witnesses
A. H. Opsahl.
E. C. Skinkle

Inventor
Thomas W. Jerrems
By his Attorneys
Williamson Merchant

T. W. JERREMS.
GRASS TWINE MACHINE.
APPLICATION FILED JULY 7, 1910.
1,023,081.
Patented Apr. 9, 1912.
4 SHEETS—SHEET 3.
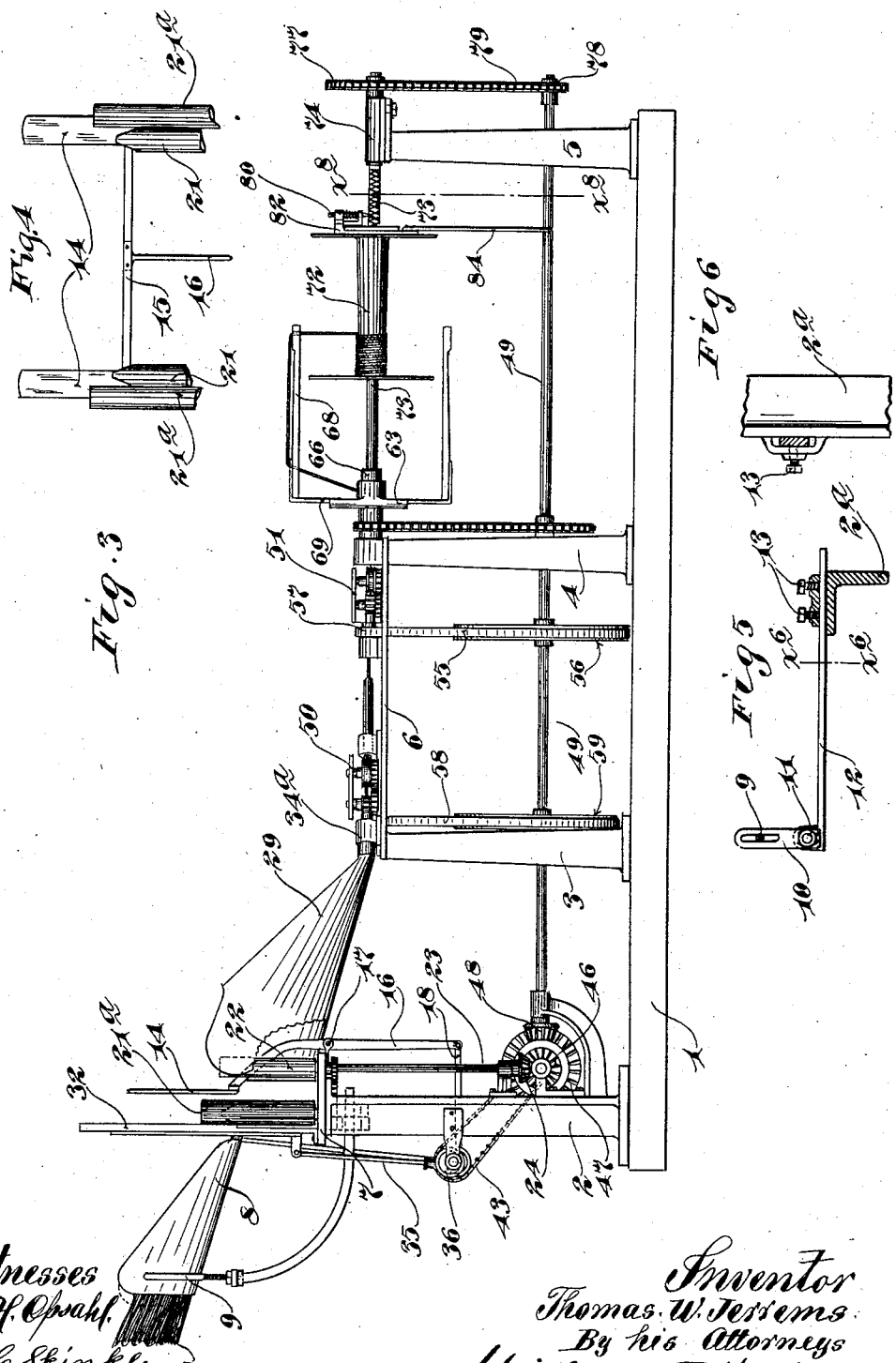
Witnesses
A. H. Opsahl
E. C. Skinkle
Inventor
Thomas W. Jerrems
By his Attorneys
Williamson & Merchant T. W. JERREMS.
GRASS TWINE MACHINE.
APPLICATION FILED JULY 7, 1910.
1,023,081.
Patented Apr. 9, 1912.
4 SHEETS—SHEET 4.
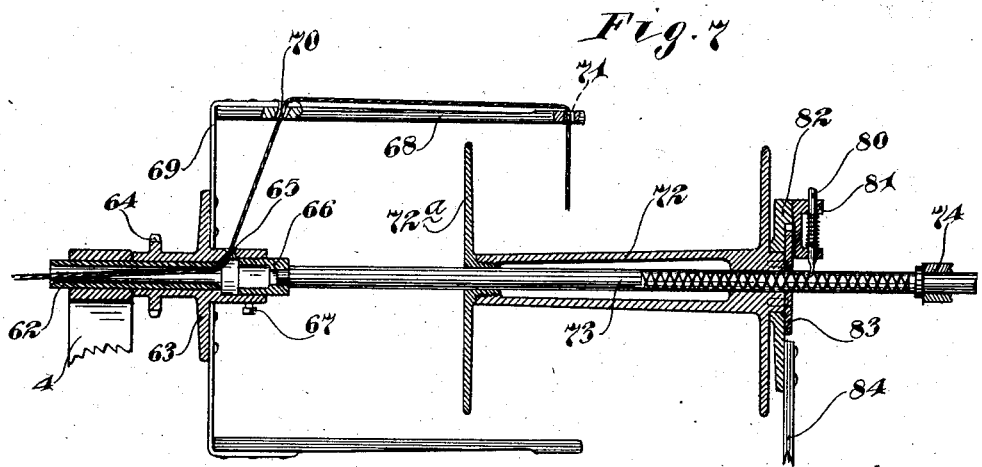
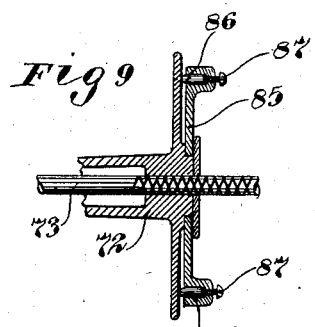
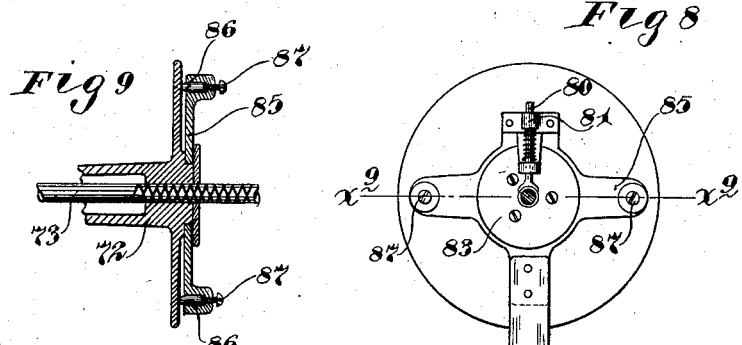
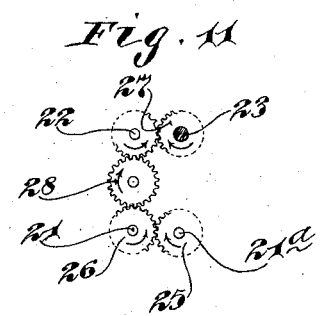
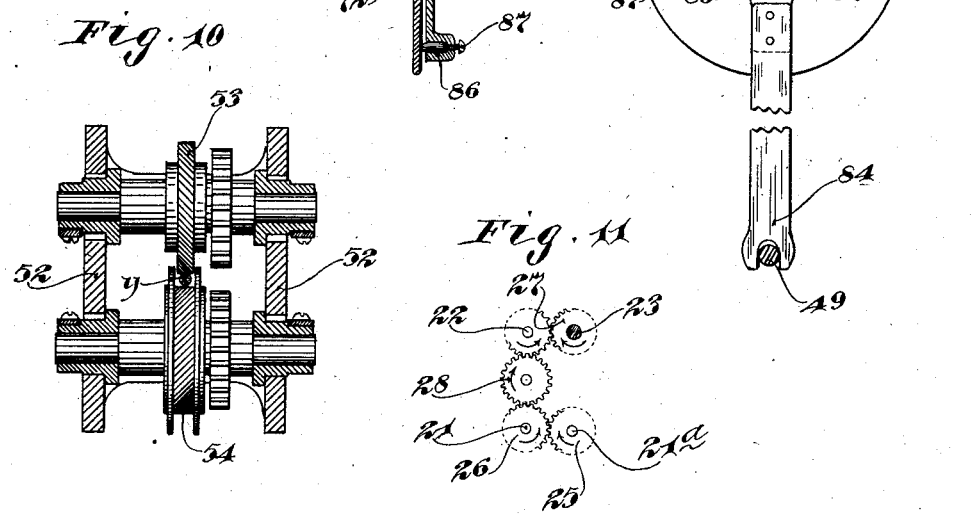
Witnesses
A. H. Opsahl.
E. C. Skinkle
Inventor.
Thomas W. Jerrems
By his Attorneys
Williamson & Merchant

UNITED STATES PATENT OFFICE.

THOMAS W. JERREMS, OF ST. PAUL, MINNESOTA, ASSIGNOR OF ONE-HALF TO EMIL H. STEIGER, OF OSHKOSH, WISCONSIN.

GRASS-TWINE MACHINE.

1,023,081.    Specification of Letters Patent.    Patented Apr. 9, 1912.

Application filed July 7, 1910. Serial No. 570,734.

*To all whom it may concern:*

Be it known that I, THOMAS W. JERREMS, a citizen of the United States, residing at St. Paul, in the county of Ramsey and State of Minnesota, have invented certain new and useful Improvements in Grass-Twine Machines; and I do hereby declare the following to be a full, clear, and exact description of the invention, such as will enable others skilled in the art to which it appertains to make and use the same.

My invention has for its object to provide an improved grass twine machine and the novelty thereof resides both in the grass feeding mechanism and in the twine forming mechanism proper.

The invention consists of the novel devices and combinations of devices hereinafter described and defined in the claims.

In the accompanying drawings which illustrate the invention, like characters indicate like parts throughout the several views.

Figure 1:
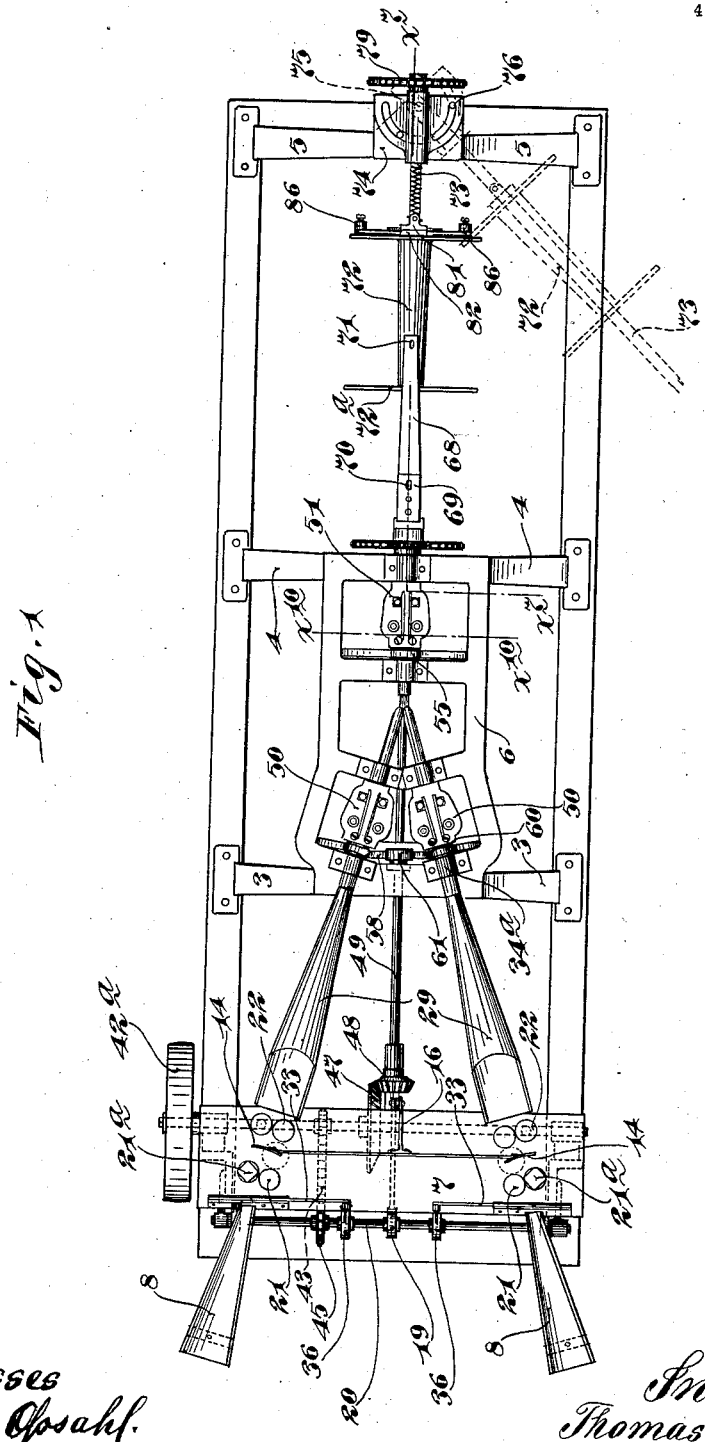
Figure 2:
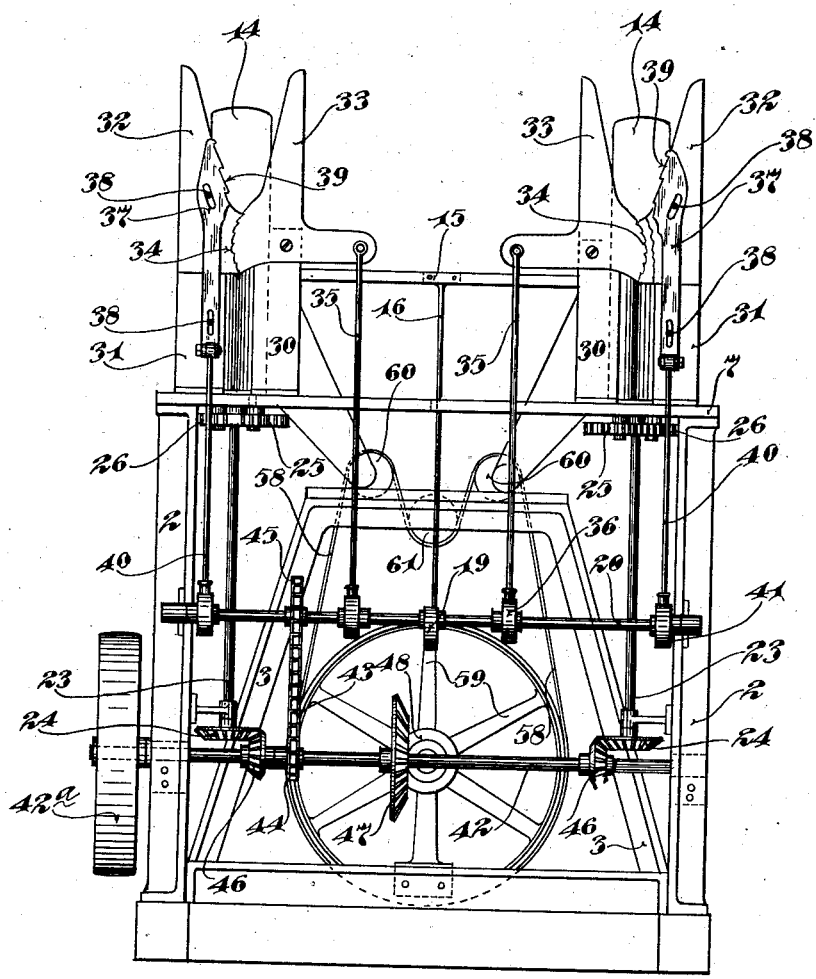

Referring to the drawings: Figure 1 is a plan view of the improved machine; Fig. 2 is a front elevation of the machine some parts being removed; Fig. 3 is a side elevation of the machine some parts being broken away; Fig. 4 is a detail in front elevation and with parts broken away showing the relation of the so called secondary feed rollers to each other and to a coöperating so called butt tamper; Fig. 5 is a detail chiefly in plan but some parts in horizontal section, showing parts of one of the grass holder supports; Fig. 6 is a detail in section on the line $x^6$ $x^6$ of Fig. 5; Fig. 7 is a vertical section taken approximately on line $x^7$ $x^7$ of Fig. 1 showing the parts on a larger scale than in Fig. 1 and some parts being broken away; Fig. 8 is a vertical section taken on the line $x^8$ $x^8$ of Fig. 3. Fig. 9 is a section taken on line $x^9$ $x^9$ of Fig. 8 some parts being broken away; Fig. 10 is a section taken on line $x^{10}$ $x^{10}$ of Fig. 1; and Fig. 11 is a diagrammatic plan view of the gear drive for the feed rollers and coöperating crushing rollers of the so called secondary feeding devices.

The frame work of this improved machine is shown as made up of a rectangular base 1, and a plurality of pedestals or frame sections 2, 3, 4, and 5. The pedestals 3 and 4 support sort of a skeleton table 6 and the pedestals 2 support a transversely extended table 7. All the parts just noted are preferably made of cast iron.

*Grass holders.*—To hold the grass in straight parallel arrangement suitable grass holders are provided and these are preferably made in the form of sheet metal troughs or hoppers 8. These grass holders 8 are supported with freedom for substantially universal adjustment and, as shown, this is accomplished as follows: The holders themselves are directly and rigidly secured to forks 9 having threaded depending stems adjustably secured by suitable nuts in the slotted end of a horizontal link 10. The other end of the link 10 is pivotally connected by a nutted bolt 11 to a horizontal lug on the upturned end of a curved supporting arm 12, the lower end of which arm works through a slot in the transverse top bar $2^a$ of the pedestal 2. These supporting arms 12 are, of course, properly spaced to support the two grass holders substantially as shown in Figs. 1 and 3; and said bars are adjustably secured, as shown, by set screws 13.

*Grass feeding mechanism.*—The butt ends of the grass stems Y contained in the grass holders 8 are engaged by tamping butter boards 14 shown as secured to the ends of a transverse bar 15 which, in turn, is intermediately secured to the upper end of lever 16. This lever 16 is intermediately pivoted at 17 to a projection from the table 7 and the lower end of said lever is connected by a crank rod 18 to an eccentric 19 secured to the central portion of a transverse counter shaft 20 journaled in suitable bearings on pedestals 2.

Located just in front of the delivery end of each grass holder 8 is a pair of upright feed rollers $21^a$ and 21 which, it may be here stated, constitute the main elements of the so called secondary feed device. These rollers $21^a$ and 21 are located just in front of the corresponding tamping butter boards 14 and they are adapted to deliver to the coöperating pairs of upright crushing rollers 22 that are located just at the rear of the corresponding tamping plates. These rollers 21 and 22 at their lower ends have depending shafts that are journaled in the table 7, and one of each pair of rollers 22 is provided with a long depending shaft 23 provided at its lower end with a beveled pinion 24. The shafts of the said rollers $21^a$, 21 and 22 are provided respectively with intermeshing gears 25, 26 and 27 and the gear 26 is connected to one of the gears 27 through intermediate gear 28 (see particularly Fig. 11). In said Fig. 11 the gears are shown partly in full and partly in dotted lines but all the gears are complete gears and the said gears serve to impart the proper rotations to the coöperating pairs of gears, required to feed the grass stems endwise, in a direction from the holders 8, toward and into concentrating spouts 29.

The coöperating feed rollers 21ª and 21 may take various forms so far as my present invention is concerned but preferably, roller 21 is relatively long and cylindrical while the roller 21ª is flattened or segmental and is provided with a conical upper end which admits the grass stems to be fed laterally downward between the rollers. The arrangement of the rollers 21ª and 21 is disclosed and broadly claimed in my prior Patent No. 932,708 of date August 31, 1909, entitled "Grass twine machine," and for selecting the grass stems and feeding the butt ends thereof laterally downward between the said rollers 21ª and 21, I employ a primary feed device which is, preferably, of substantially the form disclosed and claimed in said prior patent just identified.

The primary feed devices which work between the delivery ends of the grass holders 8 and the coöperating rollers 21ª—21 may be briefly described as follows: Rigidly secured on the table 7 immediately at the rear of the delivery ends of each holder 8 is a pair of laterally spaced pedestals 30 and 31. To each pedestal 31 is rigidly secured one or more feed blades 32 and to each pedestal 30 is pivotally connected a vibratory feed blade 33. The upper portions of the feed blades 32 and 33 diverge upwardly so as to form crotches which are adapted to receive the butt ends of the grass stems Y. The lower portions of the vibratory feed blades 33 have convex segmental ratchet toothed or serrated edge surfaces 34 that coöperate with a similar concave segmental toothed edge surface of the fixed blades 32, so that under the vibratory movements of the feed blades 33, the butt ends of the grass stems will be engaged and fed laterally downward between the coöperating pairs of rollers 21ª—21. The initial downward movements imparted to the butt ends of the grass stems by the feed blades 33, carries the said butt ends below both tamping butter boards 14, so that when the grass stems have been properly entered between the coöperating feed rollers 21ª—21, the latter, acting as secondary feed devices will feed the said grass stems endwise between the rollers 22, and from thence, into the rearwardly converging gathering spouts 29. The said spouts 29 are provided with contracted rear or delivery ends and they are rigidly secured to the frame work of the machine in a suitable way, but preferably by clamps 34ª that embrace the contracted delivery ends thereof and, as shown, are secured to the table 6.

For vibrating, the feed blades 33, crank rods 35 are connected at their upper ends to projecting arms thereof and at their lower ends are connected to eccentrics 36 carried by the previously noted countershaft 20.

As an auxiliary device for positively insuring the entrance of the grass stems between serrated surfaces of the feed blades, is provided an auxiliary feed device or agitator which is in the nature of an improvement on the device disclosed and broadly claimed in my prior Patent No. 824,871 of date July 3rd, 1906 entitled "Grass feeding mechanism for twine machines." Each such auxiliary device preferably comprises an auxiliary feed blade 37 which is connected to the pedestal 31 and fixed blades 32 by slot and pin connections 38 so arranged as to permit movement of the upper end of the said auxiliary blade approximately parallel to the inclined inner edge of the said blade 32. The auxiliary blades 37 are connected to the upper ends of the crank rods 40 the lower ends of which work on eccentrics 41 carried by the counter-shaft 20. The eccentrics are so timed in respect to the eccentrics 36 that the auxiliary blades 37 will be given a downward movement while the two edges of the coöperating feed blades 33 are being moved upward. Said auxiliary feed blades 37 have ratchet-like teeth 39 on their inner or feeding edges; and, because of their slot-and-pin connections with the parts 31 and 32 with the lower slots straight, and the upper slot oblique or at an angle to the vertical line, it follows that the upper end of each of said blades 37 will, by the pin 38, be made to have an in and out motion on its feeding edge as the blade is moved up and down by the eccentric 41 and the rod 40. Otherwise stated, the ratchet feeding edge 39 of each blade 37 will move inward toward the center of the feeding crotch as the blade moves downward, and will move outward away from the center of the crotch as the blade moves upward. It follows that the said blades 37 will coöperate with the blades 32 and 33 to the best advantage for insuring the proper selection and the proper feeding of the stems of grass. The motions of the blades 33 and 37 are so timed in respect to each other that the said parts will coöperate to insure the teeth of the pivoted blade 33 getting each always a full bite or proper number of the grass stems; and it will further follow that these successive wisps of grass stems of uniform size will be fed downward or laterally of the stems in the uniform order of succession. Under this downward or lateral feed of the wisps of grass, the butt ends of the same are brought into the bite or between the pair of rollers 21 and 21ª, which constitute the secondary feed devices of this machine, and these rollers will get their bite on the wisp of grass coincidently with the release of the wisp by the primary feed devices; and, hence, the said rollers can then advance the wisp of grass lengthwise to the crushing rollers 22 and the gathering troughs or trumpets 29 on its forward path lengthwise of the machine and toward the spinning devices thereof.

When properly supplied, the wire grass $y$ rests with its butt end portions supported by the flaring upper ends of the feed blades 32 and 33, and with its tops or small ends resting in the hopper 8; and when the grass is in proper position, the butt ends of the same will abut against the tamping butter board 14. The pivotal motion of the feed blade 33 tends to shake the grass as it rests in the grass holder, which prevents lodgment or clogging of the mass of grass, but this shaking motion of the grass is also liable to disarrange the grass stems relative to each other to a greater or less extent, and to bring the butt ends of the mass into an uneven arrangement. For this reason the butter boards 14 are mounted and connected, as described, so as to have the pivotal or tamping motion on the butt ends of the grass. By this tamping motion, the butt ends of the grass are kept comparatively even, notwithstanding the shaking motion which is imparted thereto by the pivoted blade 33.

In order to make grass twine from wire grass, the wisps of grass must be of uniform size and overlapped in uniform order of sequence. The number of stems in each selected wisp will vary according to the size of the grass stems, but the mass should be substantially uniform. Unless the wisps are of substantially uniform size and supplied in a uniform order of sequence, properly overlapped in respect to each other, no twine can be made, fit for use in the manufacture of grass rugs. The continuity of the strand must be maintained, or no twine can be formed by the spinning devices and, if the strands are not of substantially uniform thickness, the finished product will, of course, vary and be unsuitable for weaving into rugs. Owing to the great diversity in the kinds and conditions of the wire grass as it comes to the factory, it is an extremely difficult problem to get any mechanism which can be relied upon always to select the grass stems in wisps of the proper size and to feed the same in the required uniformity of sequence to enable the grass to be converted into twine.

The primary grass feed mechanism herein disclosed does the work, as proven by extensive commercial usage.

It will, of course, be understood that the radius of the arcs on which the toothed portions, or curved edges of the plates 32 and 33 are formed, may be varied at will, according to the character and position of the secondary feed devices to which the grass stems must be fed by said primary feed mechanism. For instance, with the proper degree of curvature on their serrated edges, the plates 32 and 33 are well adapted for feeding the grass laterally into the bite of horizontally disposed rollers instead of vertically disposed rollers as illustrated in this case. It must also be obvious that the return or upward movement of the vibratory feed blade 33 is an idle one, or simply a means of getting any given tooth thereof back to its initial or primary grass engaging position, and that it might be brought back to the primary position by any other suitable kind of motion. It must also be obvious that it is a matter of indifference whether the feed blades 32 and 33 be themselves so shaped as to afford a holding crotch for the butt ends of the grass, or whether said holding crotch be otherwise provided.

Located below and slightly at the rear of the counter shaft 20 is a transverse counter shaft 42 mounted in suitable bearings in the front pedestals 2 and provided at one end with a pulley 42ª over which a power driven belt, not shown, will be run to impart motion to the shaft 42, and from thence to all of the running parts of the machine. A sprocket chain 43 runs over a sprocket 44 on the shaft 42 and over a sprocket 45 on the counter-shaft 20. The countershaft 42 carries a pair of reversely beveled gears 46 that mesh one with each of the bevel gears 24 on the lower ends of the roller shafts 23, and thus impart the proper feed movements to the rollers of the secondary feed devices. At each central portion the countershaft 42 bears a bevel gear 47 that meshes with a bevel pinion 48 carried by the front end of a long countershaft 49 and is extended longitudinally of the machine and is mounted with suitable bearings on the pedestals 2, 3, 4 and 5.

*Twine forming mechanism.*—From the converging ends of the gathering spouts 29 the two streams of grass stems are delivered, first, to a pair of so called primary twisters, which twist the grass stems to form the two strands, and thence, to a common so called secondary twister which serves to twist together the two twisted strands to form the twine. These twisters in themselves may take various forms but are preferably of substantially the form disclosed in my prior Patent No. 824,792 of date July 3rd, 1906 entitled "Grass twine machines." These twisters are located in suitable seats formed in table 6 and are mounted in suitable bearings on the said table. The primary twisters are indicated as entireties on Fig. 1 by the numeral 50 while the secondary or common twister is indicated in its entirety by the numeral 51. All three of these twisters are of substantially the same construction and Fig. 10 may be taken to illustrate either thereof. Of the parts of the twister as shown in Fig. 10 it is only desirable to note the laterally spaced plates 52 of the rotary twisting head and the coöperating feed rollers 53—54 which rollers are given the feed movement when the twister heads are rotated on their axes. The secondary twister 51 is shown as driven by a belt 55 which runs over a large pulley 56 on the countershaft 49 and over a very small pulley 57 on the tubular hub of the said secondary twister. Rotary motion is imparted to the two primary twisters by a belt 58 which runs over a large pulley 59 on countershaft 49, and over pulleys 60 on the tubular hubs of said primary twisters. The upper portion of the belt 58 in passing from one to the other of the pulleys 60 is caused to run under an idle pulley 61 journaled on the pedestal 3. The completed twine from the secondary twister 51 is delivered through a tubular guide 62 rigidly secured to the bearing pedestal 4 (see, particularly, Fig. 7).

*Reeling mechanism.*—This invention includes among its novel features, an improved reeling mechanism which, as shown, is constructed as follows: Mounted to rotate on the fixed guide top or sleeve 62 is a flanged hub 63 that carries a sprocket 64 and in its projecting end is formed with a radial twine passage 65 and is provided with a coupling socket 66 adjustably but rigidly held by set screws 67. A pair of axially offset approximately parallel bars 68 are rigidly secured to the flange of the hub 63, as shown, by metal arms 69. One of these bars 68 is provided with twine passages at 70 and 71 through which and the passage 65, the twine is passed as best shown in Fig. 7. A large spool of twine receiving drum 72 is mounted to rotate or to travel on the spindle 73 the outer end of which is rotatively mounted in a bearing 74 that is pivotally connected at 75 to the flanged top of the rear pedestal 5. The flanged base of the bearing 74 is adapted to be rigidly but adjustably connected to the flanged head of the pedestal 5 by slot and screw connections 76. At its extreme rear end the spindle 73 is provided with a sprocket 77 and a sprocket 78 on the rear of the countershaft 49 over which runs a sprocket chain 79. The front end of the spindle 73 is shown as reduced in diameter and detachably engaged with a seat in the projecting end of the coupling socket 66. The spool 72 has a detachable end flange 72ᵃ (see Fig. 7) which, as shown, is secured to the tubular body of said spool by threaded engagement. Approximately the rear half portion of the spindle 73 is formed with reverse or crossed right and left threads with which engages an automatic motion reversing plunger 80 of well known construction shown as spring seated in a bifurcated bearing 81 rigidly secured to the non-rotary traveling head 82 that is loosely mounted on a projecting hub of the spool 72. The annular head 82 is, as shown, secured on the hub of the said spool by an annular retaining flange 83 rigidly secured to said hub. To hold the head 82 against rotation with the spool while free to travel therewith on the spindle 73, said head is provided with a depending leg 84 the lower end of which is bifurcated so that it embraces and loosely engages counter-shaft 49. Also the annular head 82 is provided with projecting arms 85 equipped with friction shoes or members 86. These shoes 86 frictionally engage with the adjacent flange of the spool 72 and are made adjustable by set screws 87 so that the frictional engagement may be increased or decreased at will. These friction shoes frictionally hold the spool against too rapid rotation but permit the same to be rotated under the tension of the twine which is mounted thereon under rotation of the head 63 and its guide arms 68. In the drawing 2 arms 68 are shown so as to counter balance the rotary twine delivery device but so far as the delivery of the twine is concerned, only one of these said arms is required.

When the machine is in action and while the twine is being rotated on the spool, the spool will be automatically fed first in one direction and then in the other on the spindle 73 so as to properly distribute the twine in layers on the spool.

The filled spool may be removed from the spindle first by slipping the coupling socket 66 forward out of engagement with the reduced end of the said spindle; and then the said spindle is turned into the position indicated by dotted lines in Fig. 1 so as to permit the removal of the spool from the spindle. The mounted twine may be removed from the spool when the flanged head 72ᵃ is removed from the body of the spoool.

The efficiency of the machine above described has been demonstrated in practice.

It must be understood that the primary grass feed mechanism, herein disclosed, is from the broad point of view, within the scope of the broad or generic claims contained in my prior patent, 745,625, of date December 1st, 1903.

What I claim is:

1. In a grass feeding mechanism for grass twine machines, the combination with a grass holder, of a main feed member having serrations arranged in and movable on the arc of a circle, and a movable toothed auxiliary feed device operative on the grass blades in the lower portion of said holder, to feed the same downward to the serrations of said main feed member.

2. In a grass feeding mechanism for grass twine machines, the combination with a grass holder, of a main feed member having serrations arranged in and movable on the arc of a circle, and a vibratory auxiliary feed device operative on the grass blades in the lower portion of said holder, to feed the same downward to the serrations of said main feed member.

3. In a machine of the kind described, the combination with a grass holder, of a primary grass feeding device having a fixed toothed member and a pivotally mounted toothed member, a vibratory auxiliary toothed member operative to feed the grass blades downward in said holder and to insure the initial engagement thereof by the said pivoted toothed member.

4. In a machine of the kind described, the combination with a grass holder, of a primary grass feeding device having a fixed toothed member and a pivotally mounted toothed member, a vibratory auxiliary toothed member operative to feed the grass blades downward in said holder and to insure the initial engagement thereof by the said pivoted toothed member, and means for alternately vibrating the said pivoted toothed member and auxiliary toothed member.

5. In a machine of the kind described, the combination with a coöperating fixed and a pivotally mounted toothed member constituting a primary feed device, the said members having upwardly diverging arms affording a grass holder, of an auxiliary toothed feed member mounted for movements with its teeth exposed adjacent to the arm of said fixed member, and means for alternately imparting operative feed movements to said pivoted feed member and to said auxiliary toothed member.

6. In a machine of the kind described, the combination with a twine forming mechanism and a twine guiding tube extended therefrom, of a driven sleeve rotatively mounted on said tube and provided with an axial offset twine delivery device, of a reversely threaded spindle detachably journaled to said rotary sleeve at one end and supported for angular movements at its other end, a spool mounted to travel on said spindle, a head to which said spool is rotatively connected, a frictional connection between said head and spool, means for holding said head against rotation but permitting the same to travel with said spool, and a reversible threaded engagement device on said head coöperating with the reverse threads of said spindle to impart back and forth traveling movements to said spool.

7. In a machine of the kind described, the combination with a pair of opposing feed blades constructed to afford between the same a holding crotch for the butt ends of the grass to be fed thereby and means to move one or more of said blades to produce the feeding action, of a tamping butter board adapted to tamp the butt ends of the grass as held between said feed blades for keeping the butt ends of the grass even, notwithstanding the shaking motion imparted thereto by the movable member or members of said opposing feed blades, substantially as described.

In testimony whereof I affix my signature in presence of two witnesses.

THOMAS W. JERREMS.

Witnesses:
 LORA G. HOFFMAN,
 HARRY D. KILGORE.

---

Copies of this patent may be obtained for five cents each, by addressing the "Commissioner of Patents, Washington, D. C."